(12) United States Patent
Feng et al.

(10) Patent No.: US 12,705,131 B2
(45) Date of Patent: Aug. 11, 2026

(54) METHOD, APPARATUS, DEVICE, STORAGE MEDIUM, AND PROGRAM PRODUCT FOR IDENTIFYING AN ABNORMAL COMPONENT

(71) Applicant: Beijing Bytedance Network Technology Co., Ltd., Shijingshan District (CN)

(72) Inventors: Yadong Feng, Beijing (CN); Qian Zhou, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/719,426

(22) PCT Filed: Mar. 24, 2023

(86) PCT No.: PCT/CN2023/083793
§ 371 (c)(1),
(2) Date: Jun. 13, 2024

(87) PCT Pub. No.: WO2023/197851
PCT Pub. Date: Oct. 19, 2023

(65) Prior Publication Data

US 2025/0053474 A1 Feb. 13, 2025

(30) Foreign Application Priority Data

Apr. 14, 2022 (CN) ......................... 202210395564.4

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/302* (2013.01); *G06F 11/3476* (2013.01)

(58) Field of Classification Search
CPC .. G06F 11/079; G06F 11/302; G06F 11/3476; G06F 11/0751; G06F 11/0793; G06F 2201/865
See application file for complete search history.

(56) References Cited

U.S. PATENT DOCUMENTS 6,681,348 B1 1/2004 Vachon
9,612,897 B1 * 4/2017 Bernico ................ G06N 20/00
(Continued)

FOREIGN PATENT DOCUMENTS

CN 104794046 A 7/2015
CN 106547782 A 3/2017
(Continued)

OTHER PUBLICATIONS

China National Intellectual Property Administration, Notice of Allowance for Chinese Application No. 202210395564.4, mailed Oct. 12, 2024, 8 pages.

(Continued)

*Primary Examiner* — Jonathan D Gibson
(74) *Attorney, Agent, or Firm* — Alleman Hall LLP

(57) ABSTRACT

A method, apparatus, device, storage medium, and program product for identifying an abnormal component includes: acquiring exception log information for a target application program; obtaining, based on exception address information in the exception log information and a first mapping relationship, symbolic information of the exception address information, wherein the symbolic information comprises index information, and the first mapping relationship comprises a mapping relationship between address information and symbolic information that is obtained based on a predetermined symbol table; obtaining a compilation path of the exception log information based on the index information in the symbolic information and a second mapping relationship, wherein the second mapping relationship com- (Continued)

START

ACQUIRE EXCEPTION LOG INFORMATION FOR A TARGET APPLICATION PROGRAM — S301

OBTAIN, BASED ON EXCEPTION ADDRESS INFORMATION IN THE EXCEPTION LOG INFORMATION AND A FIRST MAPPING RELATIONSHIP, SYMBOLIC INFORMATION OF THE EXCEPTION ADDRESS INFORMATION, WHEREIN THE SYMBOLIC INFORMATION COMPRISES INDEX INFORMATION, AND THE FIRST MAPPING RELATIONSHIP COMPRISES A MAPPING RELATIONSHIP BETWEEN ADDRESS INFORMATION AND SYMBOLIC INFORMATION THAT IS OBTAINED BASED ON A PREDETERMINED SYMBOL TABLE — S302

OBTAIN A COMPILATION PATH OF THE EXCEPTION LOG INFORMATION BASED ON THE INDEX INFORMATION IN THE SYMBOLIC INFORMATION AND A SECOND MAPPING RELATIONSHIP, WHEREIN THE SECOND MAPPING RELATIONSHIP COMPRISES A MAPPING RELATIONSHIP BETWEEN INDEX INFORMATION AND COMPILATION PATH THAT IS OBTAINED BASED ON THE PREDETERMINED SYMBOL TABLE — S303

DETERMINE THE ABNORMAL COMPONENT BASED ON THE COMPILATION PATH AND PREDETERMINED CONFIGURATION INFORMATION INDICATING A LOCATION OF COMPONENT INFORMATION IN THE COMPILATION PATH — S304

END

300 prises a mapping relationship between index information and compilation path that is obtained based on the predetermined symbol table; and determining the abnormal component based on the compilation path and predetermined configuration information indicating a location of component information in the compilation path.

20 Claims, 4 Drawing Sheets

(51) Int. Cl.
*G06F 11/30* (2006.01)
*G06F 11/34* (2006.01)

(56) References Cited

U.S. PATENT DOCUMENTS 9,990,273 B2 * 6/2018 Ilangovan ........... G06F 11/3612
11,138,094 B2 * 10/2021 Stelmar Netto ...... G06F 11/366
11,157,390 B2 * 10/2021 Acharyya ........... G06F 11/3624
11,231,986 B1 * 1/2022 Silakov ................. G06F 11/079
11,392,444 B1 * 7/2022 Ghose ................... G06F 11/079
11,615,015 B2 * 3/2023 Renie .................. G06F 11/3698 717/125
11,775,409 B1 * 10/2023 Silakov ............... G06F 11/0772 714/57
11,797,366 B1 * 10/2023 Ross ..................... H04L 41/069
2006/0123279 A1 6/2006 Cardinell
2007/0294683 A1 12/2007 Lee et al.
2009/0013208 A1 * 1/2009 DiMuzio ............. G06F 11/0748 707/999.005
2011/0067007 A1 * 3/2011 Zamarreno ......... G06F 11/3612 717/128
2013/0007534 A1 * 1/2013 Beard ................. G06F 11/0751 714/45
2013/0152056 A1 6/2013 Chang et al.
2014/0325486 A1 * 10/2014 Zhang ................. G06F 11/3466 717/125
2015/0248318 A1 * 9/2015 Farinacci ............ G06F 11/3476 714/37
2016/0350170 A1 * 12/2016 Hermany ............ G06F 11/0787
2018/0005153 A1 1/2018 Ferguson, IV
2019/0079818 A1 3/2019 Handa et al.
2019/0227904 A1 * 7/2019 Raviv ..................... G06F 30/20
2019/0377629 A1 * 12/2019 Williamson ........ G06F 11/3612
2020/0278875 A1 9/2020 Chan et al.
2021/0303435 A1 9/2021 Xu et al.
2022/0012165 A1 * 1/2022 Chen ................... G06F 11/3051
2022/0019512 A1 * 1/2022 Renie .................... G06F 11/323
2023/0034587 A1 * 2/2023 Ranka ................. G06F 11/0775
2025/0053474 A1 * 2/2025 Feng ..................... G06F 11/302

FOREIGN PATENT DOCUMENTS

CN 108089977 A 5/2018
CN 108334515 A 7/2018
CN 109032909 A 12/2018
CN 110704302 A 1/2020
CN 110764945 A 2/2020
CN 111061638 A 4/2020
CN 111104185 A 5/2020
CN 111258803 A 6/2020
CN 111309506 A 6/2020
CN 111857808 A 10/2020
CN 113110952 A 7/2021
CN 113157731 A 7/2021
CN 113742119 A 12/2021
CN 114840400 A 8/2022

OTHER PUBLICATIONS

China National Intellectual Property Administration, Office Action and Search Report Issued in Application No. 202210395564.4, Apr. 22, 2024, 9 pages. Submitted with partial English translation.
ISA China National Intellectual Property Administration, International Search Report Issued in Application No. PCT/CN2023/083793, Jun. 9, 2023, WIPO, 8 pages.
European Patent Office, Extended European Search Report Issued in Application No. 23787497.9, Mar. 9, 2026, Germany, 12 pages.

* cited by examiner

100

300

METHOD, APPARATUS, DEVICE, STORAGE MEDIUM, AND PROGRAM PRODUCT FOR IDENTIFYING AN ABNORMAL COMPONENT

The present application claims priority of a Chinese invention patent application with application number CN202210395564.4, filed on Apr. 14, 2022, entitled "METHOD, APPARATUS, DEVICE, STORAGE MEDIUM, AND PROGRAM PRODUCT FOR IDENTIFYING AN ABNORMAL COMPONENT".

FIELD

The present disclosure relates to a field of computer technology, in particular, to method, apparatus, device, storage medium, and program product for identifying an abnormal component.

BACKGROUND

The complexity of application programs is increasing, thus their development process is usually performed based on modular division of labor. Each developer is responsible for developing a corresponding module, and then the code of respective modules is unified into a data package for publication. This collaborative mode greatly improves development efficiency. However, if an exception occurs during the use of the application program, such as crash or the like, it is necessary to check the corresponding code and make modifications, if necessary. Currently, in this modular development mode, after detecting an exception, exception information is usually manually assigned to the corresponding developer for inspection or modification. This method for manually assigning exception information has a high level of human involvement. Moreover, as the business complexity of the application programs increases, the labor cost further increases, and the efficiency of identifying an abnormal module decreases.

SUMMARY

The present disclosure proposes a method, apparatus, device, storage medium, and program product for identifying an abnormal component, in order to at least solve the technical problems of low efficiency and high cost for identifying an abnormal component to a certain extent.

A first aspect of the present disclosure provides a method for identifying an abnormal component, comprising: acquiring exception log information for a target application program; obtaining, based on exception address information in the exception log information and a first mapping relationship, symbolic information of the exception address information, wherein the symbolic information comprises index information, and the first mapping relationship comprises a mapping relationship between address information and symbolic information that is obtained based on a predetermined symbol table; obtaining a compilation path of the exception log information based on the index information in the symbolic information and a second mapping relationship, wherein the second mapping relationship comprises a mapping relationship between index information and compilation path that is obtained based on the predetermined symbol table; and determining the abnormal component based on the compilation path and predetermined configuration information indicating a location of component information in the compilation path.

A second aspect of the present disclosure provides an apparatus for identifying an abnormal component, comprising: an acquisition module configured for acquiring exception log information for a target application program; a first mapping module configured for obtaining, based on exception address information in the exception log information and a first mapping relationship, symbolic information of the exception address information, wherein the symbolic information comprises index information, and the first mapping relationship comprises a mapping relationship between address information and symbolic information that is obtained based on a predetermined symbol table; a second mapping module configured for obtaining a compilation path of the exception log information based on the index information and a second mapping relationship, wherein the second mapping relationship comprises a mapping relationship between index information and compilation path that is obtained based on the predetermined symbol table; and a component determination module configured for determining the abnormal component based on the compilation path and predetermined configuration information regarding compilation path and component information.

A third aspect of the present disclosure provides an electronic device comprising one or more processors, a memory, and one or more programs that are stored on the memory and executable by the one or more processors, wherein the one or more programs comprises instructions for implementing a method in accordance with the first aspect.

A fourth aspect of the present disclosure provides a non-transitory computer-readable storage medium comprising a computer program that, when executed by one or more processors, causes the processor to implement a method in accordance with the first aspect.

A fifth aspect of the present disclosure provides a computer program product comprising computer program instructions that, when running on a computer, cause the computer to implement a method in accordance with the first aspect.

In view of the above, according to the method, apparatus, device, storage medium, and program product for identifying an abnormal component that are provided by the present disclosure, a mapping relationship between address information and symbolic information as well as a mapping relationship between index information and compilation path are constructed based on a predetermined symbol table, respectively. Based thereon, a compilation path corresponding to the exception log information is determined, and then a component where the exception occurs is determined based on the compilation path and a predetermined configuration information. Thereby, automated identification of an abnormal component can be realized, which benefits the efficiency of assigning exception information related to abnormal components, and thus the development efficiency and maintenance efficiency can be further improved.

DESCRIPTION OF THE DRAWINGS

In order to provide a clearer explanation of the technical solutions in the present disclosure or related technologies, a brief introduction will be given below to the accompanying drawings used for describing the embodiments or related technologies. It is obvious that the accompanying drawings in the following description are merely the embodiments of the present disclosure. For those skilled in the art, other accompanying drawings can be obtained based on these accompanying drawings without creative work.

DETAILED DESCRIPTION

Figure 1:
FIG. 1 is a schematic diagram of an architecture for identifying an abnormal component in accordance with embodiments of the present disclosure.

In order to make the purpose, technical solutions, and advantages of the present disclosure clearer, the present disclosure is descried in detail in combination with specific embodiments and with reference to the accompanying drawings.

It should be noted that, unless otherwise defined, the technical or scientific terms used in embodiments of the present disclosure shall have the usual meaning understood by those with general skills in a field to which the present disclosure belongs. The terms "first", "second", and similar terms used in embodiments of the present disclosure do not indicate any order, quantity, or importance, but are only used to distinguish different components. A word such as "including", "including" or the like means that an element or an object that appears before the word comprises those listed after the word and their equivalents, without excluding other elements or objects. Words such "connection", "connection" or the like are not limited to physical or mechanical connections, but can include electrical connections, regardless of direct or indirect. "Up", "down", "left", "right", etc. are only used to represent relative positional relationships. When the absolute position of the described object changes, the relative positional relationship may also change accordingly.

During the operation of an application program, there may be logical errors, such as call errors, array out of bounds, null pointers, etc., which may lead to an abnormal operation of the application program, such as a crash of the program. When an application program encounters an exception, the relevant information of the exception will be automatically recorded in an exception log, which provides a data basis for application program developers to solve the exception problem. However, the existing method for assigning exception information comprises manually assigning by designated personnel. When an application program encounters an exception, the corresponding exception log information is recorded in the exception log. The designated personnel manually determine the component/module that experienced the exception based on call stack information of the exception log information, and assign the relevant exception information to a developer, which corresponds to a module where the exception occurred, for inspection. This manual judgment and assignment method greatly restricts the efficiency of assignment of exception information, reduces the identification efficiency of abnormal components, and leads to a decrease in the development and maintenance efficiency of application programs, and an increase of labor costs. Therefore, it is an urgent technical problem that needs to be solved that how to achieve automated identification of an abnormal component to improve the efficiency of identifying abnormal components, thereby improving the development efficiency and maintenance efficiency of application program, and reducing costs.

In view of this, embodiments of the present disclosure provide a method, apparatus, device, storage medium, and program product for identifying an abnormal component. A mapping relationship between address information and symbolic information as well as a mapping relationship between index information and compilation path are constructed based on a predetermined symbol table, respectively. Based thereon, a compilation path corresponding to the exception log information is determined, and then a component where the exception occurs is determined based on the compilation path and a predetermined configuration information. Thereby, automated identification of an abnormal component can be realized, which benefits the efficiency of assigning exception information related to abnormal components, and thus the development efficiency and maintenance efficiency can be further improved.

FIG. 1 illustrates a schematic diagram of an architecture for identifying an abnormal component in accordance with embodiments of the present disclosure. Referring to FIG. 1, the architecture 100 for identifying an abnormal component may include a server 110, a terminal 120, and a network 130 providing a communication link. The server 110 and terminal 120 can be connected via wired or wireless network 130. The server 110 may be an independent physical server, a server cluster comprising a plurality of physical servers, or a distributed system. It may also be a cloud server that provides basic cloud computing services such as cloud services, cloud databases, cloud computing, cloud functions, cloud storage, network services, cloud communication, middleware services, domain name services, security services, CDN, and big data and artificial intelligence platforms.

Terminal 120 may be implemented as hardware or software. For example, when the terminal 120 is implemented as hardware, it may be a variety of electronic devices with a screen and supporting page display, including but not limited to a smartphone, a tablet, an e-book reader, a laptop, a desktop computer, and so on. When the terminal 120 device is implemented as software, it may be installed in the electronic devices listed above. It may be implemented as a plurality of software or software modules (such as software or software modules used to provide distributed services), or as a single software or software module. The scope of the present disclosure is not limited in this respect.

It should be noted that the method for identifying an abnormal component provided in embodiments of the present disclosure may be executed by the terminal 120 or by the server 110. It should be noted that the number of terminals, networks, and servers in FIG. 1 is only for illustrative purposes and is not intended to limit them. According to implementation requirements, there may be any suitable number of terminals, networks, and servers.

Figure 2:
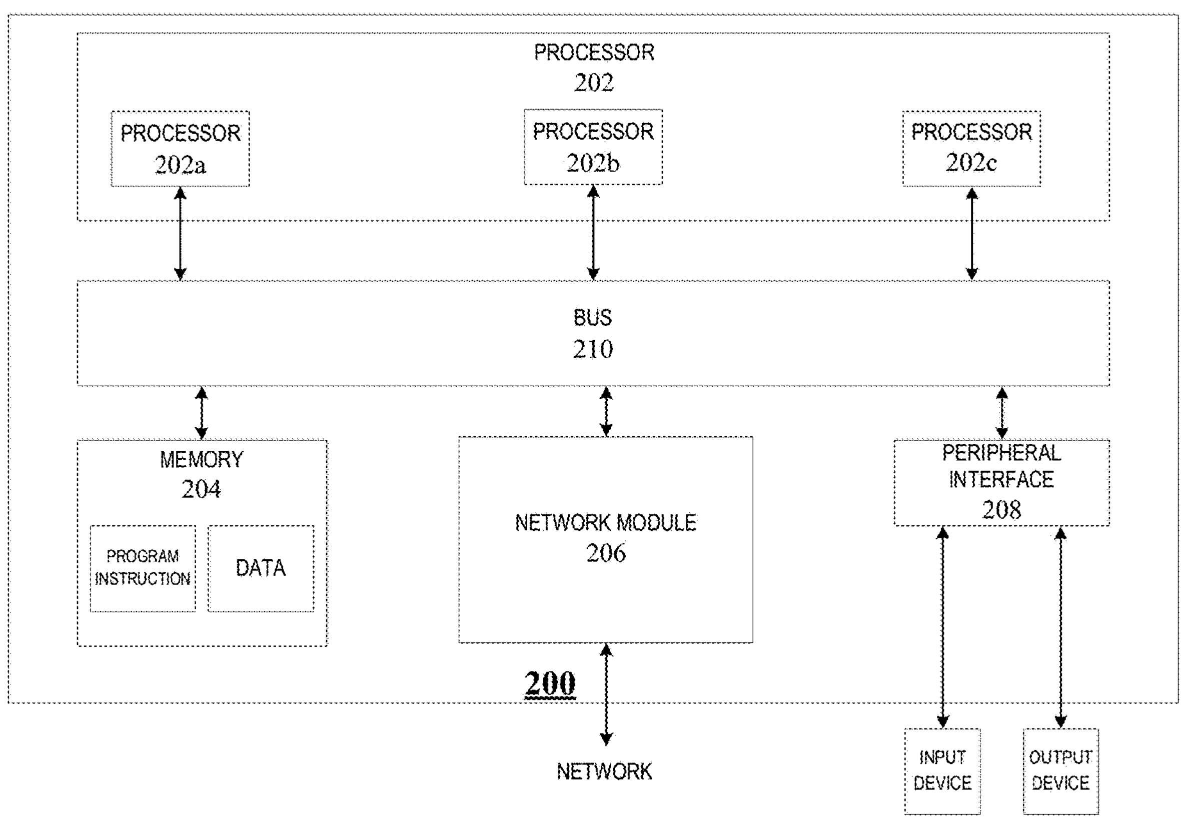
FIG. 2 is a schematic diagram of a hardware structure of an example electronic device in accordance with embodiments of the present disclosure.

FIG. 2 illustrates a schematic diagram of a hardware structure of an example electronic device 200 in accordance with embodiments of the present disclosure. As shown in FIG. 2, the electronic device 200 may include: a processor 202, a memory 204, a network module 206, a peripheral interface 208, and a bus 210. The processor 202, the memory 204, the network module 206, and the peripheral interface 208 realize communication connection between each other within the electronic device 200 through the bus 210.

The processor 202 may be a Central Processing Unit (CPU), an image processor, a neural network processor (NPU), a microcontroller (MCU), a programmable logic device, a digital signal processor (DSP), an application specific integrated circuit (ASIC), or one or more integrated circuits. The processor 202 may be used to perform functions related to the technology described herein. In some embodiments, the processor 202 may also include a plurality of processors integrated into a single logic component. For example, as shown in FIG. 2, the processor 202 may include a plurality of processors 202*a*, 202*b*, and 202*c*.

Memory 204 may be configured to store data (such as instructions, computer code, etc.). As shown in FIG. 2, the data stored in memory 204 may include program instructions (e.g., program instructions for implementing the method for identifying an abnormal component in accordance with the embodiments of the present disclosure) and the data to be processed (e.g., memory may store configuration files of other modules, etc.). The processor 202 may also access program instructions and data stored in memory 204, and execute program instructions to operate on the data to be processed. The memory 204 may include a transitory storage device or a non-transitory storage device. In some embodiments, memory 204 may include random access memory (RAM), read-only memory (ROM), optical discs, disks, hard drives, solid-state drives (SSDs), flash memory, storage sticks, etc.

The network module 206 may be configured to provide communication with other external devices to electronic device 200 via the network. This network may be any wired or wireless network capable of transmitting and receiving data. For example, the network may be a wired network, a local wireless network (such as Bluetooth, Wi-Fi, near-field communication (NFC), etc.), a cellular network, Internet, or a combination of the above. It should be understood that the types of networks are not limited to the specific examples mentioned above. In some embodiments, the network module 106 may include any number of network interface controllers (NICs), radio frequency modules, receivers, modems, routers, gateways, adapters, cellular network chips, and any combination thereof.

The peripheral interface 208 may be configured to connect the electronic device 200 to one or more peripheral devices for information input and output. For example, peripheral devices may include input devices such as keyboards, mice, touchpads, touch screens, microphones, various sensors, as well as output devices such as displays, speakers, vibrators, and indicator lights.

The bus 210 may be configured to transmit information between components of electronic device 200 (such as, the processor 202, the memory 204, the network module 206, and the peripheral interface 208), such as internal bus (e.g., a processor-memory bus), an external bus (a USB port, a PCI-E bus), etc.

It should be noted that although the architecture of the electronic device 200 mentioned above only illustrates the processor 202, memory 204, network module 206, peripheral interface 208, and bus 210, in a specific implementation process, the architecture of the electronic device 200 may also include other components necessary to realize normal operation. In addition, those skilled in the art can understand that the architecture of the electronic device 200 mentioned above may only include the components necessary to implement a solution(s) in accordance with the embodiments of the present disclosure, without necessarily including all the components shown in the figure.

A dSYM file is a product of the native compilation toolchain of an operating system (such as an IOS system), and may be used to record debugging information, including the compilation path of source files. For example, based on the debugging information recorded in the dSYM file, a method marker in debug info (such as, DW-TAG_subprogram DIE) may be indexed to the corresponding source file compilation path attribute DW_AT_decl_file to obtain the compilation path. Based on the compilation path, a corresponding pod name may be directly determined, and a component(s) corresponding to the pod name may be determined based on a predetermined symbol table. For example, dSYM files may include:

DW_AT_decl_file ("/Code1/Code2/Code3/Pods/Code4/Code5/Code6.m")

which indicates that the compilation path is "/Code1/Code2/Code3/Pods/Code4/Code5/Code6.m", and the corresponding pod name may be directly determined from it as Code4 after "Pods". Based on the pod name Code4 and a predetermined configuration information indicating a location of component information in the compilation path, a component information in the compilation path may be determined, thereby the corresponding component is determined.

An exception log file may store each function memory address that experienced an exception in the application program, and specific file names, function names, and line number information may be found in the dSYM file for these function memory addresses. Based thereon, the corresponding compilation path may be determined in the dSYM file based on the function memory address, and then the corresponding pod name may be determined based on the compilation path, thereby identifying a component that experienced the exception and achieving automatic identification of the abnormal component. Due to the dSYM file being hosted in a monitoring backend of the application program, the compilation path of its source file is independent of whether it is in source code or binary integrated form. Even for binary integrated Software Development Kits (SDKs), if debugging information is available, it is still possible to parse the complete compilation path of source files. Therefore, the solution in accordance with embodiments of the present disclosure only needs to rely on the dSYM file, which is a standardized file. Therefore, the solution in accordance with embodiments of the present disclosure is applicable to all application programs and has good universality.

Figure 3:
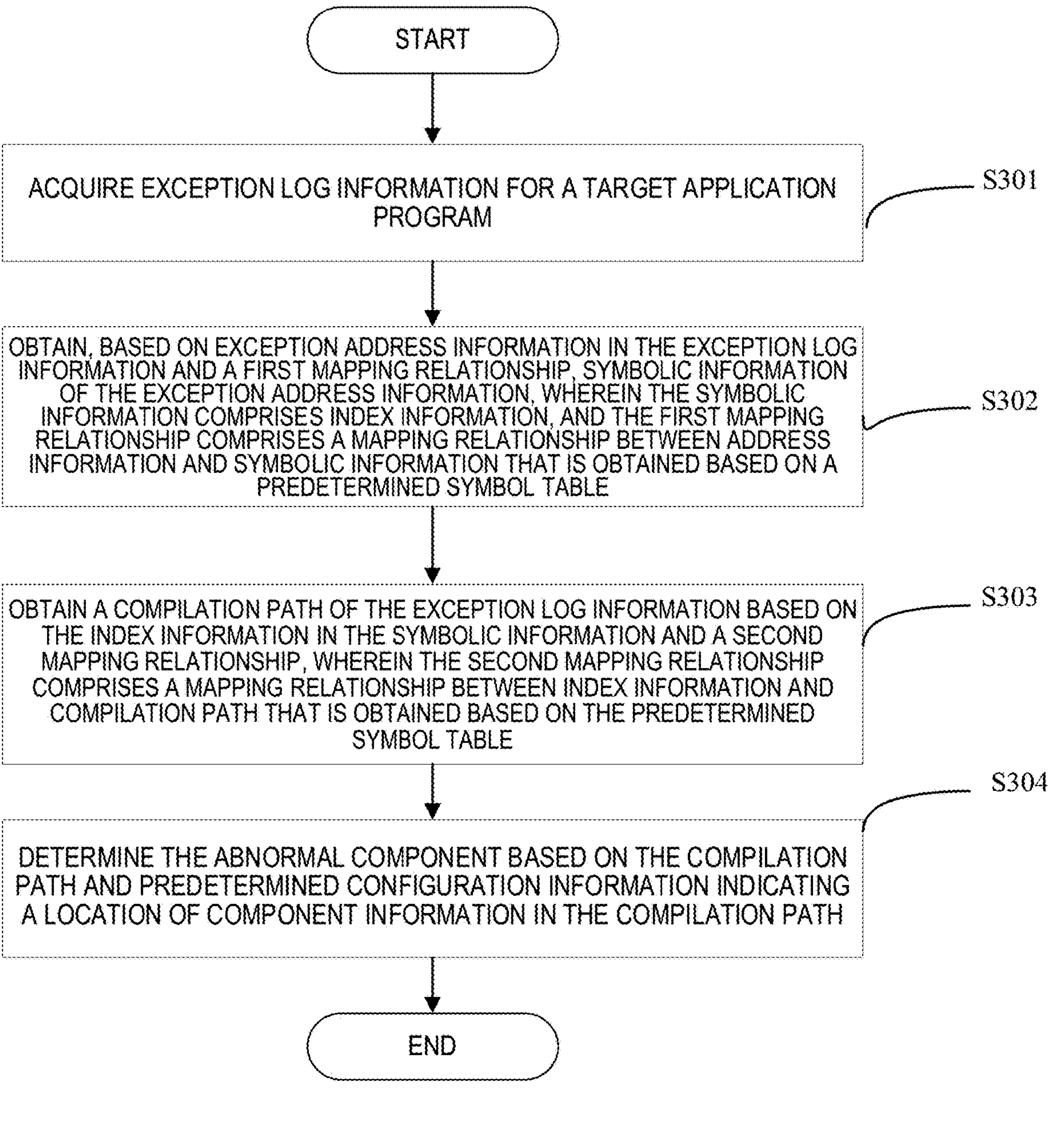
FIG. 3 is a flowchart of a method for identifying an abnormal component in accordance with embodiments of the present disclosure.

Refer to FIG. 3, which illustrates a flowchart of a method for identifying an abnormal component in accordance with embodiments of the present disclosure. In FIG. 3, the method 300 for identifying an abnormal component may include the following steps.

At step S301, acquire exception log information for a target application program.

Whenever an application experiences an exception (such as a crash or the like), an exception log is generated and stored on the device. This exception log records the stack of all executing threads in the current process, as well as exception log information such as a description of a cause of the exception, in order to quickly locate the cause of the exception.

In some embodiments, exception log information may include process information, basic information, exception information, thread backtracking, exception address information, and dynamic library information. The exception address information includes information of a binary address where the exception occurred, which needs to be symbolically parsed to obtain code function information that is readable for a developer.

At step S302, obtaining, based on exception address information in the exception log information and a first mapping relationship, symbolic information of the exception address information, wherein the symbolic information comprises index information, and the first mapping relationship comprises a mapping relationship between address information and symbolic information that is obtained based on a predetermined symbol table.

For exception log information, it is necessary to use a predetermined symbol table to map raw information such as binary addresses to method names and code line numbers at the source code level, so that developers can read them. The predetermined symbol table refers to a dSYM file with the same name and being generated in the same level directory of the compiled binary file app after source code compilation. The dSYM file contains hexadecimal based save function address mapping information, and all debugging symbols are included in the dSYM file, including file name, function name, line number, etc. Due to the fact that a new dSYM file is generated after each compilation of the source code, for each released version of an application program, a corresponding dSYM file is backed up for debugging and locating issues.

When performing symbol parsing on each line of the exception log information, the compilation path that currently matches the source file may be directly returned together. However, when the monitoring backend of an application program performs symbol parsing, it parses all symbol tables. Returning the compilation path along with the parsing result will increase the storage burden, and pose great challenges to computing and storage resources. So, based on the predetermined symbol table, a mapping relationship map adress-path between the offset address of the source file in the predetermined symbol table and the compilation path is created, and the index information I is set for each offset address adress and its corresponding compilation path path in this mapping relationship. Meanwhile, a corresponding index information I may be set in the symbolic information corresponding to the address range of each exception address information, and the index information I is returned as part of the symbolic information. So, based on the index information I in the symbolic information, a corresponding compilation path path may be directly determined in the mapping relationship map adress-path. Compared to directly returning the compilation path path in the symbolic information, determining the compilation path based on the mapping relationship map adress path can reduce the amount of data, and save computational and storage resources.

In some embodiments, the method 300 may further include: performing symbol table pre-parsing based on a predetermined symbol table to obtain the first mapping relationship between address information and symbolic information; wherein the symbolic information includes index information. Specifically, refer to FIG. 4, which illustrates a schematic diagram of a principle of the method for identifying an abnormal component in accordance with embodiments of the present disclosure. After compilation, a developer may upload the corresponding predetermined symbol table (such as .dSYM file) to the database TBS for storage, for example, through the symbol table upload module 410. After the storage succeeds, the database TBS returns an instruction of successful information to the symbol table upload module 410. When constructing the first mapping relationship through the symbol table pre-parsing module 420, the storage address of the predetermined symbol table may be obtained from the symbol table upload module 410. The symbol table upload module 410 may send the storage address of the predetermined symbol table to the symbol table pre-parsing module 420 via a rocktmq message. The symbol table pre-parsing module 420 synchronizes the predetermined symbol table from the TBS based on the storage address, and performs pre-parsing based on the obtained predetermined symbol table to obtain a mapping relationship between address information and symbolic information as the first mapping relationship. For example, the first mapping relationship map1 includes address information adress1: symbolic information symbol1_index1 (index information). The exception log information may include exception address information. For example, the exception address information is adress1, the symbolic information and index information of the exception address information adress1 may be determined as symbol1_index1 based on the exception address information adress1 and the first mapping relationship map1.

At step S303, obtaining a compilation path of the exception log information based on the index information in the symbolic information and a second mapping relationship, wherein the second mapping relationship comprises a mapping relationship between index information and compilation path that is obtained based on the predetermined symbol table.

In some embodiments, the method 300 may further include: performing symbol table pre-parsing based on a predetermined symbol table to obtain a second mapping relationship between index information and compilation path. For example, address information adress1 in the first mapping relationship may correspond to index information index1, and in the predetermined symbol table (dSYM file), the corresponding compilation path path1 may be determined based on the address information adress1. Therefore, a second mapping relationship map2 from index information index1 to compilation path path1 may be created. In this way, after obtaining the exception address information from the exception log information, symbolic_information_index_information may be determined as symbol1_index1 from the first mapping relationship map1. Then, based on the index information index1, the corresponding compilation path path1 may be determined from the second mapping relationship map2.

In some embodiments, three is a one-to-one correspondence between the compilation path and the index information in the second mapping relationship.

Furthermore, in some embodiments, the second mapping relationship may adopt a key value data structure. For example, the second mapping relationship may include K: V, where the key K represents index information and the value V represents the compilation path.

In some embodiments, performing symbol table pre-parsing based on a predetermined symbol table to obtain a second mapping relationship between index information and compilation path may further include: filtering a compilation path regarding system files in the predetermined symbol table to obtain the filtered predetermined symbol table; and generating the second mapping relationship based on the filtered predetermined symbol table.

A system file may be not related to exceptions, so the compilation path related to the system file does not participate in the identification of abnormal components. The compilation path related to the system file may include a compilation path related to a system library, such as a compilation path starting with "/Applications/Xcode". The compilation path related to the system file may also include the compilation path of files automatically generated by the compiler, for example, a file path named "<compiler-generated>". The second mapping relationship created after removing the compilation path of system file may further compress data volume, reduce storage size, and save storage space.

At step S304, determine the abnormal component based on the compilation path and predetermined configuration information indicating a location of component information in the compilation path.

In some embodiments, determining the abnormal component based on the compilation path and the predetermined configuration information indicating the location of component information in the compilation path comprises: determining a pod name of the exception log information based on the compilation path; determining component information in the compilation path based on the pod name and the predetermined configuration information; and determining the abnormal component based on the component information.

In some embodiments, determining the pod name of the exception log information based on the compilation path comprises: determining whether the compilation path comprises a first predetermined string; and in response to the compilation path comprising the first predetermined string, determining a first string following the predetermined string in the compilation path to be the pod name.

The first string following the predetermined string may refer to a string following an adjacent delimiter after the first predetermined string in the compilation path, i.e., a string between Pods/and the next/in the compilation path.

In some embodiments, the first predetermined string may include Pods or _main_/external. Specifically, for an SDK integrated in a cocoapods multi-pods manner, regardless of whether it is source code or bits binary, its feature is that the complete compilation path of the source file comprises keyword Pods, e.g., /Users/code1/code2/code3/code4/Pods/code5/code6/code7.m. Therefore, the pod name for exception log information is the string code5 between Pods/ and the next/. For an SDK integrated in a bazel monorepo multi-pods manner, the compiled path in source code format includes the keyword _main_/external, such as /code1/code2/code3/code4/_main_/external/code5/code6/code7/code8.m. Therefore, the pod name of exception log information is the string code5 between _main_/external/and the next/.

In some embodiments, determining the pod name of the exception log information based on the compilation path comprises: determining whether the compilation path comprises a first predetermined string; and in response to the compilation path not comprising the first predetermined string, determining a second string at the beginning of the compilation path to be the pod name.

The second string at the beginning may refer to the first string of the compilation path. For an SDK integrated in a bazel monorepo multi-pods mode, there is no obvious feature in the binary compilation path, e.g., code1/code2/Classes/code3.m, the string at the beginning (i.e., code1) may be used as the pod name.

In some embodiments, determining the pod name of the exception log information based on the compilation path comprises: determining whether the compilation path comprises a second predetermined string; and in response to the compilation path comprising the second predetermined string, determining a predetermined pod name corresponding to the second predetermined string in a third mapping relationship to be the pod name of the exception log information.

The second predetermined string may refer to keyword information related to the component, for example, there may be a mapping relationship between the second predetermined string and the component. For an SDK integrated in closed source code or binary dependency manner, an SDK developer may configure, in the monitoring background of the target application program, the mapping relationship between keyword information in the compilation path of the source file and pod names. In this case, the keyword information exists in the compilation path, and the corresponding pod name may be determined based on the mapping relationship. For example: /var/code1/code2/ttmp/code3/code4.mm. For the code in the player, a developer may configure a mapping relationship between the ttmp keyword information and TTPlayerSDK. In this case, if the keyword ttmp is found in the compilation path of the source file, it may be determined that the information of the abnormal component shall be assigned to the pod name TTPlayerSDK.

In some embodiments, determining the abnormal component based on the compilation path and the predetermined configuration information comprises: determining a feature of the abnormal component based on the pod name and the predetermined configuration information; and determining a name of the abnormal component based on the feature of the abnormal component, so as to determine the abnormal component.

The predetermined configuration information may be data describing relationship between compilation path and component information. Based on the predetermined configuration information, component information (e.g., component name or the like) may be determined, so that the corresponding component may be located based on the component information. Component information may be a keyword in the compilation path, or information about a position with a fixed offset relative to the keyword.

In some embodiments, the predetermined configuration information may include at least one predetermined rule, each predetermined rule including key information and an offset of key information. For example, predetermined configuration information may be in the form of a list. The predetermined rule ruler may include key information anchor+offset shift. The offset shift being greater than 0 indicates right shift, the offset shift being less than 0 indicates left shift, and the offset shift being equal to 0 indicates that the key information itself is component information. For example, for compilation address 1:

/Users/code1/code2/ttmp/code3/code4/code5.mm where key information anchor=ttmp and offset shift=0, ttmp is denoted as component information.

For compilation address 2:

/Users/code1/code2/Pods/code3/code4/code5.mm where key information anchor=/Pods/, and offset shift=1. In compilation address 2, the key information anchor (i.e., /Pods/) divides the entire compilation address 2 into two parts: a part preceding the key information anchor: /Users/code1/code2; and a part following the key information anchor: code3/code4/code5.mm. These two parts may be separated by the keyword /to obtain two arrays, i.e., first data [Users, code1, code2] and second data [code3, code4, code5.mm]. It is assumed that if the offset is 0, the component information is the key information itself; a positive number represents a subscript index in the second array (increasing from 1), i.e., moving from the key information to the right; and a negative number represents a subscript index in the first array (decreasing from −1), moving from the key information to the left. The key information in compilation address 2 is /Pods/, and the offset is 1, then the component information is code3.

For compilation address 3:

/BD/code1/code2/Classes/code3.m where key information anchor=/Classes/, and offset shift=−1. The component information in compilation address 3 is code2.

Furthermore, predetermined rules have priority. The compilation paths may be matched in order of priority until a compilation path including a corresponding predetermined rule is matched, and the component information may be determined based thereon. The higher the priority, the higher the universality of the predetermined rule, and the greater the probability of matching the compilation path with the predetermined rule to obtain component information.

In practice, for components of object-oriented code (i.e., OC code), the component information determined from the compilation path may be the component name itself. However, for some underlying libraries, component information and component name may not be exactly the same. Hence, business configuration information may also be set to facilitate the subsequent splitting/assignment of various stability issues to different businesses from the host's perspective, which benefits guiding the optimization of indicators for each business. For example, business configuration information may include: component information Info and corresponding business line business. Based on this business line business, it may be determined that the component executing the business line is the component corresponding to component information Info.

In some embodiments, the exception log information comprises a name of an abnormal dynamic library, and the method further comprises: acquiring a name of a component dynamic library corresponding to a component in the target application program; determining whether the name of the component dynamic library matches the name of the abnormal dynamic library; and in response to the name of the component dynamic library matching the name of the abnormal dynamic library, determining a component corresponding to the name of the component dynamic library to be the abnormal component.

Specifically, for an SDK integrated in the form of dynamic libraries, the monitoring platform of the target application program supports dynamic library assignment rules. That is, the SDK may register dynamic library names on this monitoring platform, and when the exception call stack matches the name of the dynamic library, it is assigned to the target developer who registered the name of the dynamic library. For example, if the exception log includes a dynamic library named RTC, a component corresponding to the name of the dynamic library may be directly identified as an abnormal component, and the information of the abnormal component may also be assigned to the RTC SDK.

In some embodiments, the method 300 further comprises: acquiring component configuration information determined by a developer; determining whether the abnormal component matches the component configuration information; and in response to the abnormal component matching the component configuration information, sending information of the abnormal component to a target developer.

Figure 4:
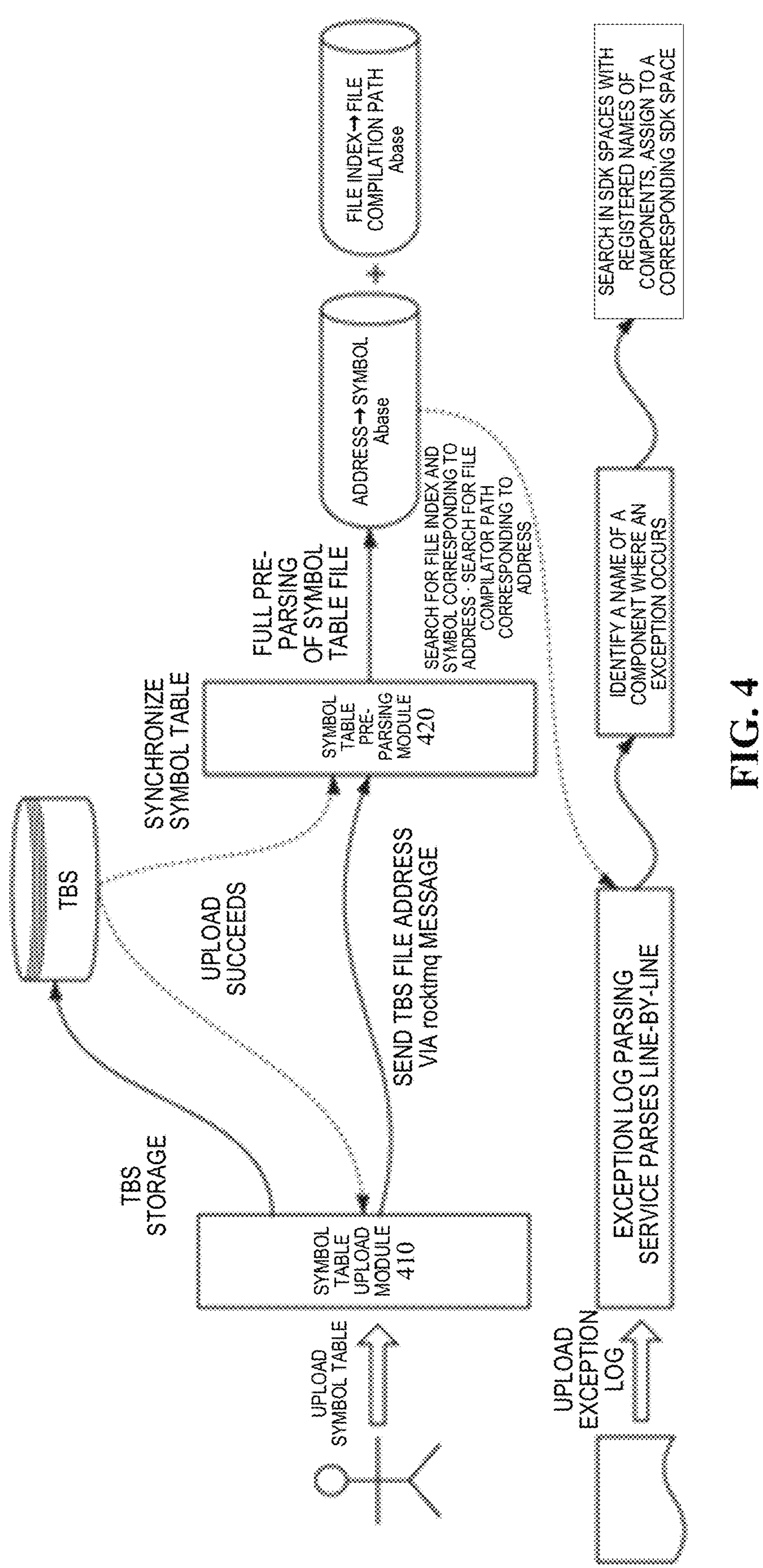
FIG. 4 is a schematic diagram of a principle of the method for identifying an abnormal component in accordance with embodiments of the present disclosure.
Figure 5:
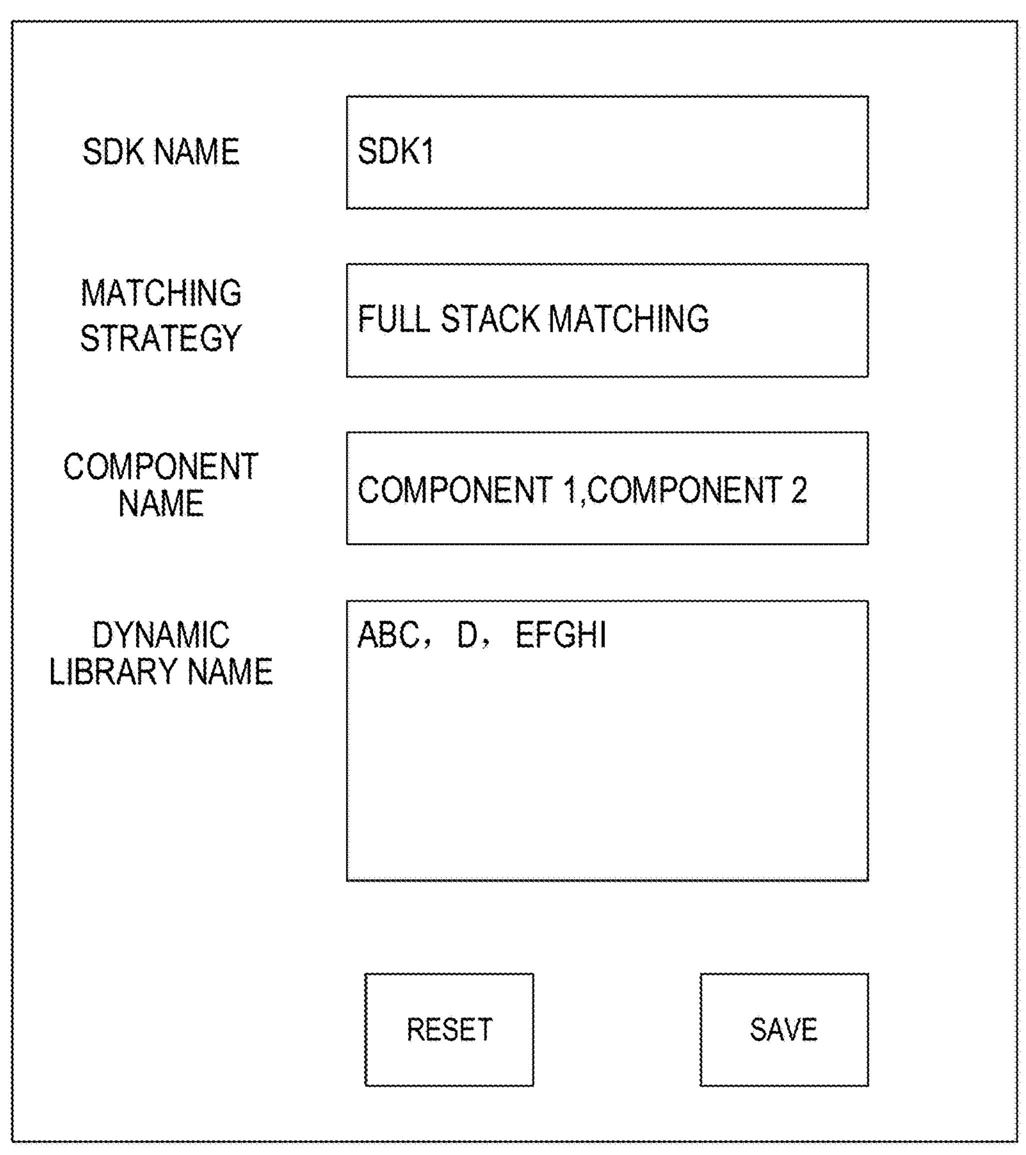
FIG. 5 is a schematic diagram of an interface of component configuration information in accordance with embodiments of the present disclosure.

Specifically, developers may configure component configuration information based on their own needs. The component configuration information may include SDK name, matching strategy, component name, dynamic library name, etc. The matching strategy may refer to whether the returned abnormal component information is the full stack information or partial stack information of the component, and the component name may refer to the static library component name. After determining the abnormal component at step S304, it is compared with the component configuration information. If the abnormal component is included in the component configuration information, it indicates that the information of the abnormal component is checked and optimized by the developer. Then, the information of the same abnormal component is sent to the developer. As shown in FIG. 5, which illustrates a schematic diagram of an interface of component configuration information in accordance with embodiments of the present disclosure, the SDK name set by a developer X is SDK1, the matching strategy is full stack matching, the component names are component 1 and component 2, and the dynamic library names are ABC, D, EFGHI. In this case, according to the method of embodiments of the present disclosure, when the target application program corresponding to SDK1 experiences exceptions such as crash, the exception log information records information of an exception address where the exception occurs, the compilation path is determined through the first mapping relationship and the second mapping relationship, and the abnormal component where the exception occurred is determined in combination with the predetermined configuration information. If the component name or dynamic library name of the abnormal component is consistent with the predetermined configuration information (i.e., the component name is component 1 or component 2, or the dynamic library name is ABC, D, or EFGHI), then all information of the abnormal component is sent to the developer X. As shown in FIG. 4, after identifying a name of a component where an exception occurs (such as step S304), search for the abnormal component in SDK spaces (such as SDK1) with registered names of components and assign it to the corresponding SDK space. Thereby, automated identification of abnormal components is realized, the efficiency of assigning exception information related to abnormal components is improved, and the development efficiency and maintenance efficiency of SDKs is enhanced.

It should be noted that the method of embodiments of the present disclosure may be executed by a single device, such as one computer or server. The method of embodiments of the present disclosure may also be applied in a distributed scenario, where a plurality of devices cooperate with each other to implement the method. In this distributed scenario, one of the plurality of devices may only perform one or more steps in the method of embodiments of the present disclosure, and the plurality of devices may interact with each other to complete the method.

It should be noted that some embodiments disclosed herein have been described above. Other embodiments are within the scope of the attached claims. In some cases, the actions or steps recited in the claims may be executed in a different order than in the aforementioned embodiments and still achieve the desired results. In addition, the process depicted in the drawings does not necessarily require a specific or continuous order to achieve the desired results. In some implementations, multitasking and parallel processing are also possible or may be advantageous.

Based on the same inventive concept and corresponding to any of the above embodiments of the method, the present disclosure also provides an apparatus for identifying an abnormal component.

Figure 6:
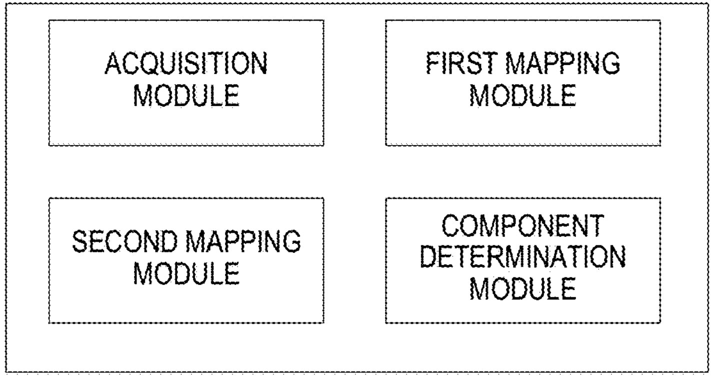
FIG. 6 is a schematic diagram of an apparatus for identifying an abnormal component in accordance with embodiments of the present disclosure.

Referring to FIG. 6, the apparatus for identifying an abnormal component comprises: an acquisition module configured for acquiring exception log information for a target application program; a first mapping module configured for obtaining, based on exception address information in the exception log information and a first mapping relationship, symbolic information of the exception address information, wherein the symbolic information comprises index information, and the first mapping relationship comprises a mapping relationship between address information and symbolic information that is obtained based on a predetermined symbol table; a second mapping module configured for obtaining a compilation path of the exception log information based on the index information and a second mapping relationship, wherein the second mapping relationship comprises a mapping relationship between index information and compilation path that is obtained based on the predetermined symbol table; and a component determination module configured for determining the abnormal component based on the compilation path and predetermined configuration information regarding compilation path and component information.

For the convenience of description, the above apparatus is divided into various modules based on their functions. Of course, for implementing the present disclosure, the function of each module may be implemented in the same or a plurality of software and/or hardware.

The apparatus in accordance with the above embodiment is used to realize the corresponding method for identifying an abnormal component in accordance with any of the above embodiments, and has the beneficial effect of the corresponding method embodiment, which will not be repeated here.

Based on the same inventive concept and corresponding to any of the above embodiments of the method, the present disclosure also provides a non-transitory computer-readable storage medium. The non-transitory computer-readable storage medium stores computer instructions for causing a computer to implement the method for identifying an abnormal component in accordance with any of the above-descried embodiments.

The computer-readable media of this embodiment includes permanent and non-permanent, movable and non-movable media, and information storage may be achieved by any method or technique. Information may be computer-readable instructions, data structures, program modules, or other data. Examples of storage medium for computers include, but are not limited to, phase change memory (PRAM), static random access memory (SRAM), dynamic random access memory (DRAM), other types of random access memory (RAM), read-only memory (ROM), electrically erasable programmable read-only memory (EE-PROM), flash memory or other memory technologies, read-only optical disc read-only memory (CD-ROM), digital multifunctional optical disc (DVD) or other optical storage, magnetic cassette tapes, magnetic tape magnetic disk storage or other magnetic storage devices, or any other non-transmission medium that may be used to store information that may be accessed by computing devices.

The computer instructions stored in the storage medium of the above embodiment are used causing a computer to implement the method for identifying an abnormal component in accordance with any of the above-descried embodiments, and have the beneficial effect of the corresponding method embodiment, which will not be repeated here.

A person skilled in the art will understand that the discussion of any of the above embodiments is only illustrative and not intended to imply that the scope of the present disclosure (including claims) is limited to these examples; Under the ideas of the present disclosure, the technical features in the above embodiments or different embodiments may also be combined, and the steps may be implemented in any order. There are many other changes in different aspects of the embodiments of the present disclosure as described above, which are not provided in the details for simplicity.

In addition, to simplify the explanation and discussion, and to avoid making it difficult to understand the embodiments of the present disclosure, the provided drawings may or may not show well-known power/ground connections with integrated circuit (IC) chips and other components. In addition, the apparatus may be shown in the form of a block diagram to avoid making it difficult to understand the embodiments of the present disclosure, and this also takes into account the fact that the details of the implementation of these block diagram apparatus are highly dependent on the platform on which the embodiments of the present disclosure will be implemented (i.e., these details should be fully within the understanding of those skilled in the art). It is evident to those skilled in the art that specific details (such as circuits) have been elaborated to describe the example embodiments disclosed herein, and it is possible to implement the embodiments of the present disclosure without these specific details or with changes to these specific details. Therefore, these descriptions should be considered explanatory rather than restrictive.

Although the present disclosure has been described in conjunction with specific embodiments, many substitutions, modifications, and variations of these embodiments will be apparent to those skilled in the art based on the previous description. For example, other memory architectures (such as Dynamic RAM (DRAM)) may use the discussed embodiments.

Embodiments of the present disclosure aims to cover all such substitutions, modifications, and variations falling within the broad scope of the attached claims. Therefore, any omissions, modifications, equivalent substitutions, improvements, etc. made within the spirit and principles of embodiments of the present disclosure shall be included within the scope of protection of the present disclosure.

What is claimed is:

1. A method for identifying an abnormal component, comprising:

in response to an exception event occurring during execution of an application program on a terminal device, automatically acquiring, by a processor of the terminal device, exception log information for the application program, wherein the exception log information is automatically generated during the execution of the application program;

automatically performing symbol parsing, by the processor of the terminal device, based on exception address information in the exception log information and a first mapping relationship, to obtain symbolic information of the exception address information, wherein the symbolic information comprises index information, and the first mapping relationship comprises a mapping relationship between address information and symbolic information that is obtained based on a predetermined symbol table;

automatically obtaining, by the processor of the terminal device, a compilation path of the exception log information based on the index information in the symbolic information and a second mapping relationship, wherein the second mapping relationship comprises a mapping relationship between index information and compilation path that is obtained based on the predetermined symbol table, and a one-to-one correspondence between the index information and the compilation path;

automatically determining, by the processor of the terminal device, the abnormal component based on the compilation path and predetermined configuration information indicating a location of component information in the compilation path;

automatically determining, by the processor of the terminal device, whether a dynamic library name of the abnormal component matches a dynamic library name comprised in component configuration information; and in response to the dynamic library name of the abnormal component matching the dynamic library name comprised in the component configuration information, automatically assigning, by the processor of the terminal device, information of the abnormal component to a component space according to a dynamic library assignment rule, the component space comprising one of a plurality of SDK spaces with registered names of components, wherein a component assigned to the component space is to be maintained.

2. The method of claim 1, wherein determining the abnormal component based on the compilation path and the predetermined configuration information indicating the location of component information in the compilation path comprises:

determining a pod name of the exception log information based on the compilation path;

determining component information in the compilation path based on the pod name and the predetermined configuration information; and determining the abnormal component based on the component information.

3. The method of claim 2, wherein determining the pod name of the exception log information based on the compilation path comprises:

determining whether the compilation path comprises a first predetermined string; and in response to the compilation path comprising the first predetermined string, determining a first string following the predetermined string in the compilation path to be the pod name.

4. The method of claim 2, wherein determining the pod name of the exception log information based on the compilation path comprises:

determining whether the compilation path comprises a first predetermined string; and in response to the compilation path not comprising the first predetermined string, determining a second string at the beginning of the compilation path to be the pod name.

5. The method of claim 2, wherein determining the pod name of the exception log information based on the compilation path comprises:

determining whether the compilation path comprises a second predetermined string; and in response to the compilation path comprising the second predetermined string, determining a predetermined pod name corresponding to the second predetermined string in a third mapping relationship to be the pod name of the exception log information.

6. The method of claim 1, wherein determining the abnormal component based on the compilation path and the predetermined configuration information comprises:

determining a feature of the abnormal component based on the pod name and the predetermined configuration information; and determining a name of the abnormal component based on the feature of the abnormal component, so as to determine the abnormal component.

7. The method of claim 1, wherein the exception log information comprises a name of an abnormal dynamic library, and the method further comprises:

acquiring a name of a component dynamic library corresponding to a component in the application program;

determining whether the name of the component dynamic library matches the name of the abnormal dynamic library; and in response to the name of the component dynamic library matching the name of the abnormal dynamic library, determining a component corresponding to the name of the component dynamic library to be the abnormal component.

8. The method of claim 1, further comprising:

acquiring component configuration information determined by a developer;

determining whether the abnormal component matches the component configuration information; and in response to the abnormal component matching the component configuration information, sending information of the abnormal component to the developer.

9. An electronic device comprising a memory, a processor, and a computer program that is stored on the memory and executable on the processor, the electronic device being a terminal device, wherein the processor, when running the computer program, performs acts comprising:

in response to an exception event occurring during execution of an application program on the terminal device, automatically acquiring, by the processor of the terminal device, exception log information for the application program, wherein the exception log information is automatically generated during the execution of the application program;

automatically performing symbol parsing, by the processor of the terminal device, based on exception address information in the exception log information and a first mapping relationship, to obtain symbolic information of the exception address information, wherein the symbolic information comprises index information, and the first mapping relationship comprises a mapping relationship between address information and symbolic information that is obtained based on a predetermined symbol table;

automatically obtaining, by the processor of the terminal device, a compilation path of the exception log information based on the index information in the symbolic information and a second mapping relationship, wherein the second mapping relationship comprises a mapping relationship between index information and compilation path that is obtained based on the predetermined symbol table, and a one-to-one correspondence between the index information and the compilation path;

automatically determining, by the processor of the terminal device, an abnormal component based on the compilation path and predetermined configuration information indicating a location of component information in the compilation path;

automatically determining, by the processor of the terminal device, whether a dynamic library name of the abnormal component matches a dynamic library name comprised in component configuration information; and in response to the dynamic library name of the abnormal component matching the dynamic library name comprised in the component configuration information, automatically assigning, by the processor of the terminal device, information of the abnormal component to a component space according to a dynamic library assignment rule, the component space comprising one of a plurality of SDK spaces with registered names of components, wherein a component assigned to the component space is to be maintained.

10. The electronic device of claim 9, wherein determining the abnormal component based on the compilation path and the predetermined configuration information indicating the location of component information in the compilation path comprises:

determining a pod name of the exception log information based on the compilation path;

determining component information in the compilation path based on the pod name and the predetermined configuration information; and determining the abnormal component based on the component information.

11. The electronic device of claim 10, wherein determining the pod name of the exception log information based on the compilation path comprises:

determining whether the compilation path comprises a first predetermined string; and in response to the compilation path comprising the first predetermined string, determining a first string following the predetermined string in the compilation path to be the pod name.

12. The electronic device of claim 10, wherein determining the pod name of the exception log information based on the compilation path comprises:

determining whether the compilation path comprises a first predetermined string; and in response to the compilation path not comprising the first predetermined string, determining a second string at the beginning of the compilation path to be the pod name.

13. The electronic device of claim 10, wherein determining the pod name of the exception log information based on the compilation path comprises:

determining whether the compilation path comprises a second predetermined string; and in response to the compilation path comprising the second predetermined string, determining a predetermined pod name corresponding to the second predetermined string in a third mapping relationship to be the pod name of the exception log information.

14. The electronic device of claim 9, wherein determining the abnormal component based on the compilation path and the predetermined configuration information comprises:

determining a feature of the abnormal component based on the pod name and the predetermined configuration information; and determining a name of the abnormal component based on the feature of the abnormal component, so as to determine the abnormal component.

15. The electronic device of claim 9, wherein the exception log information comprises a name of an abnormal dynamic library, and the acts further comprises:

acquiring a name of a component dynamic library corresponding to a component in the application program;

determining whether the name of the component dynamic library matches the name of the abnormal dynamic library; and in response to the name of the component dynamic library matching the name of the abnormal dynamic library, determining a component corresponding to the name of the component dynamic library to be the abnormal component.

16. The electronic device of claim 9, further comprising:

acquiring component configuration information determined by a developer;

determining whether the abnormal component matches the component configuration information; and in response to the abnormal component matching the component configuration information, sending information of the abnormal component to the developer.

17. A non-transitory computer-readable storage medium, wherein the non-transitory computer-readable storage medium stores computer instructions for causing a computer to perform acts comprising:

in response to an exception event occurring during execution of an application program on a terminal device, automatically acquiring, by a processor of the terminal device, exception log information for the application program, wherein the exception log information is automatically generated during the execution of the application program;

automatically performing symbol parsing, by the processor of the terminal device, based on exception address information in the exception log information and a first mapping relationship, to obtain symbolic information of the exception address information, wherein the symbolic information comprises index information, and the first mapping relationship comprises a mapping relationship between address information and symbolic information that is obtained based on a predetermined symbol table;

automatically obtaining, by the processor of the terminal device, a compilation path of the exception log information based on the index information in the symbolic information and a second mapping relationship, wherein the second mapping relationship comprises a mapping relationship between index information and compilation path that is obtained based on the predetermined symbol table, and a one-to-one correspondence between the index information and the compilation path;

automatically determining, by the processor of the terminal device, an abnormal component based on the compilation path and predetermined configuration information indicating a location of component information in the compilation path;

automatically determining, by the processor of the terminal device, whether a dynamic library name of the abnormal component matches a dynamic library name comprised in component configuration information; and in response to the dynamic library name of the abnormal component matching the dynamic library name comprised in the component configuration information, automatically assigning, by the processor of the terminal device, information of the abnormal component to a component space according to a dynamic library assignment rule, the component space comprising one of a plurality of SDK spaces with registered names of components, wherein a component assigned to the component space is to be maintained.

18. The non-transitory computer-readable storage medium of claim 17, wherein determining the abnormal component based on the compilation path and the predetermined configuration information indicating the location of component information in the compilation path comprises:

determining a pod name of the exception log information based on the compilation path;

determining component information in the compilation path based on the pod name and the predetermined configuration information; and determining the abnormal component based on the component information.

19. The non-transitory computer-readable storage medium of claim 17, wherein determining the abnormal component based on the compilation path and the predetermined configuration information comprises:

determining a feature of the abnormal component based on the pod name and the predetermined configuration information; and determining a name of the abnormal component based on the feature of the abnormal component, so as to determine the abnormal component.

20. The non-transitory computer-readable storage medium of claim 17, wherein the exception log information comprises a name of an abnormal dynamic library, and the acts further comprises:

acquiring a name of a component dynamic library corresponding to a component in the application program;

determining whether the name of the component dynamic library matches the name of the abnormal dynamic library; and in response to the name of the component dynamic library matching the name of the abnormal dynamic library, determining a component corresponding to the name of the component dynamic library to be the abnormal component.

* * * * *